US012756452B1

(12) United States Patent
McCarrick

(10) Patent No.: US 12,756,452 B1
(45) Date of Patent: Oct. 6, 2026

(54) RAPID-SWITCHING ROTATABLE WAVEGUIDE POLARIZER FEED ASSEMBLY FOR MAINTAINING SATELLITE COMMUNICATIONS LINKS DURING SPOT BEAM TRANSITION

(71) Applicant: Micro-Ant, LLC, Jacksonville, FL (US)

(72) Inventor: Charles McCarrick, Jacksonville, FL (US)

(73) Assignee: Micro-Ant, LLC, Jacksonville, FL (US)

( * ) Notice: Subject to any disclaimer, the term of this patent is extended or adjusted under 35 U.S.C. 154(b) by 0 days.

(21) Appl. No.: 19/560,942

(22) Filed: Mar. 9, 2026

(51) Int. Cl.
*H04B 7/10* (2017.01)

(52) U.S. Cl.
CPC .................................... *H04B 7/10* (2013.01)

(58) Field of Classification Search
CPC ........................................................ H04B 7/10
See application file for complete search history.

(56) References Cited

U.S. PATENT DOCUMENTS 2,945,193 A 7/1960 Strom
4,126,835 A 11/1978 Gould
4,178,574 A 12/1979 Edens et al.
4,951,010 A 8/1990 Grim
4,968,957 A 11/1990 Hudspeth et al.
6,118,412 A 9/2000 Chen
7,592,887 B2 9/2009 Chao et al.
8,525,616 B1 9/2013 Shaw et al.
8,643,560 B2 2/2014 Mahon et al.
9,142,893 B2 9/2015 Son et al.
9,214,711 B2 12/2015 Thomson et al.
9,276,302 B2 3/2016 Henderson et al.
9,640,847 B2 5/2017 Jensen et al.
(Continued)

FOREIGN PATENT DOCUMENTS

WO WO 2010/076016 A1 7/2010

*Primary Examiner* — William Kelleher
*Assistant Examiner* — Hailey R Le
(74) *Attorney, Agent, or Firm* — Mark Young, PA

(57) ABSTRACT

A rotatable waveguide polarizer feed assembly for satellite and microwave antenna systems includes a stationary waveguide structure, a rotatable waveguide body, and an internal polarization-transforming structure positioned in an axial waveguide passage of the rotatable waveguide body. Internal transfer passages in the rotatable waveguide body selectively communicate with stationary waveguide channels. Rotation of the rotatable waveguide body changes the angular orientation of the polarization-transforming structure and selectively reverses polarization state, including reversal between opposite circular polarizations. The assembly may effect polarization reversal on a microsecond timescale, enabling satellite terminals to traverse spot beam boundaries of opposite circular polarization handedness without dropping the active communications link or requiring a modem reset. Applications include airborne terminals traversing multiple spot beams from one or more satellites, and stationary ground terminals tracking satellites in medium earth or low earth orbits as those satellites transition between spot beams of opposite polarization handedness.

24 Claims, 12 Drawing Sheets

(56) References Cited

U.S. PATENT DOCUMENTS

| | | | | |
|---|---|---|---|---|
| 2015/0130565 | A1* | 5/2015 | Henderson | H01P 1/062<br>333/257 |
| 2023/0170596 | A1* | 6/2023 | Benitez | H01P 1/2088<br>333/208 |
| 2024/0396191 | A1* | 11/2024 | Glâtre | H01P 1/165 |

* cited by examiner

RAPID-SWITCHING ROTATABLE WAVEGUIDE POLARIZER FEED ASSEMBLY FOR MAINTAINING SATELLITE COMMUNICATIONS LINKS DURING SPOT BEAM TRANSITION

FIELD OF THE INVENTION

The present invention relates generally to radio-frequency waveguide devices, antenna feed systems, and polarization control structures for satellite communication and microwave systems. More particularly, the invention relates to a compact feed assembly having a mechanically rotatable waveguide polarizer section that selectively changes polarization state while maintaining a direct, low-loss RF path between fixed electronic circuitry and an antenna.

BACKGROUND OF THE INVENTION

High-power satellite communication systems, microwave relay systems, radar systems, and other radio-frequency transmission platforms commonly require precise control of signal polarization. In many applications, the ability to selectively operate in one of two orthogonal or opposite polarization states is necessary to satisfy link requirements, reduce interference, maintain compatibility with a desired satellite transponder or remote station, or provide system-level operational flexibility. Typical systems may employ linear horizontal and vertical polarizations, slant polarizations, or right-hand and left-hand circular polarizations, depending upon the application and the antenna/feed architecture.

Traditional solutions for handling multiple polarization states frequently rely on multi-port feed structures, such as dual-polarized feed assemblies employing ortho-mode transducers, diplexer networks, separate transmit and receive paths, multiple amplifiers, and associated interconnection structures. In one common arrangement, separate high-power amplifiers are dedicated to respective transmit polarization channels, while separate low-noise amplifiers are dedicated to respective receive polarization channels. Although such arrangements can support simultaneous operation on multiple polarizations, they tend to increase system size, weight, cost, thermal complexity, electrical power consumption, and parts count. The use of multiple amplifiers and multiple waveguide runs may also complicate balancing, mounting, and integration at the antenna feed location.

Other systems introduce waveguide switching structures to obtain redundancy or polarization agility. For example, waveguide switches can reroute a transmitter or receiver chain from one polarization port to another, thereby allowing reassignment of available electronics or reversal of polarization usage without physically rebuilding the feed. However, such switch-based architectures typically add insertion loss, mechanical complexity, mass, cost, and additional failure modes. Large high-power waveguide switches are often physically bulky and may impose undesirable penalties in feed-arm loading, gimbal balance, packaging, and environmental ruggedness. The switched architecture can also require additional manifolds, bends, interfaces, and sealing features, each of which can degrade electrical performance and increase manufacturing complexity.

A further challenge arises when rotational movement is introduced into a waveguide assembly. Direct-contact rotating RF joints can be susceptible to friction, wear, particulate generation, dimensional drift, and performance degradation over time. Leakage, impedance variation, changes in voltage standing wave ratio, and deterioration of polarization purity can occur if the rotating interface is not carefully controlled. In demanding high-frequency environments, particularly in satellite and microwave applications, even modest discontinuities at a rotating interface may adversely affect gain, return loss, isolation, axial ratio, or other performance characteristics.

There remains a need for a compact, mechanically simple, electrically efficient antenna feed architecture capable of selectively changing polarization state without requiring duplicated transmit and receive electronics, without requiring heavy multi-path switching hardware, and without introducing substantial RF loss or degradation at the movable interface. There is also a need for a rotatable polarizer assembly that can maintain a substantially direct and efficient RF path, that can be manufactured with a reduced bill of materials, and that can provide reliable operation in high-power and low-noise RF environments.

A particularly acute need arises in satellite communication systems serving mobile or tracking platforms. In airborne applications, an aircraft in flight may traverse multiple spot beams transmitted by one or more satellites, where adjacent or successive spot beams may employ opposite circular polarization handedness—for example, alternating between left-hand circular polarization and right-hand circular polarization across a coverage area. Similarly, a stationary ground antenna tracking a satellite in a medium earth orbit or low earth orbit may transition between spot beams of opposite circular polarization handedness as the satellite moves across the sky. In either scenario, the antenna terminal must reverse polarization at the moment of beam transition to maintain the satellite communications link. If the polarization reversal is not accomplished with sufficient speed, the link is dropped, requiring a reset of the modem at the antenna terminal and causing a communication outage lasting on the order of several minutes. Existing polarization-switching architectures, including motorized linear polarization alignment systems and waveguide switch-based re-routing arrangements, are incapable of effecting this reversal on the timescale required to sustain an active link through a beam transition. There is accordingly a need for a feed assembly capable of reversing circular polarization handedness on a timescale of microseconds or similarly rapid durations, sufficient to maintain an uninterrupted satellite communications link during spot beam transitions in both airborne and ground-based tracking applications.

The invention is directed to overcoming one or more of the problems and solving one or more of the needs as set forth above.

SUMMARY OF THE INVENTION

The present invention provides a rotatable waveguide polarizer feed assembly configured for use in satellite communication systems, microwave antenna systems, radar systems, and other radio-frequency platforms in which selectable polarization control is desired. In preferred embodiments, the assembly provides a compact feed architecture in which a fixed electronic section communicates with a rotatable polarizing waveguide section that is selectively repositionable relative to a stationary waveguide port structure. Rather than changing the RF signal path through duplicated electronics or through bulky waveguide switches, the assembly changes the effective polarization state by physically rotating a waveguide polarizer body containing an internal polarization-transforming structure.

An object of the invention is to provide a polarization-selective feed assembly capable of reversing or changing polarization state while preserving a substantially direct RF path between fixed transmit/receive electronics and the antenna. Another object is to provide such an assembly with reduced insertion loss relative to switched architectures. Another object is to reduce size, weight, and cost by avoiding duplicated amplifier chains and by reducing the number of waveguide components, manifolds, and switching elements. Another object is to provide a mechanically rotatable polarizer section that can be actuated manually or by a motorized actuator. Another object is to provide polarization reversal at a speed sufficient to maintain an active satellite communications link during transitions between spot beams of opposite circular polarization handedness, without dropping the link or requiring a modem reset. Another object is to provide polarization switching on a timescale of microseconds or similarly rapid durations, suitable for airborne satellite communication terminals traversing multiple spot beams of one or more satellites, and for stationary ground-based terminals tracking moving satellites in medium earth orbit or low earth orbit that transition between spot beams of opposite circular polarization handedness as the satellite moves across the sky. Another object is to provide an architecture applicable to both circular and linear polarization systems in which rapid polarization reversal is required to sustain a satellite communications link during beam transitions. Another object is to provide a stable rotating RF interface that does not rely upon a high-friction contacting RF joint. Another object is to provide a choke-isolated interface that suppresses leakage and preserves RF integrity across a physical rotational boundary. Another object is to provide a feed assembly that is compact and sufficiently linear and balanced to facilitate mounting on a feed support, reflector arm, gimbal, or other antenna support structure. Another object is to provide a robust architecture suitable for high-power transmit operation and low-noise receive operation. Another object is to provide a broadband polarization conversion arrangement using a stepped septum, ridge polarizer, dielectric vane, or equivalent phase-shifting structure within a rotatable waveguide body. Another object is to provide an architecture that is difficult to replicate using only conventional duplicated amplifier paths or waveguide switch hardware because the polarization function is embodied in a mechanically reorientable polarizer section integrated with a choke-defined rotary waveguide interface.

In an exemplary implementation, the invention includes a stationary waveguide port body having a central receiving region and at least two stationary waveguide channels extending radially or otherwise laterally relative to a rotational axis. A rotatable waveguide polarizer body (i.e., rotatable septum body) is received in or adjacent the receiving region and is mounted for rotation relative to the stationary waveguide port body. The rotatable waveguide polarizer body includes an axial waveguide passage configured to communicate with an antenna-side waveguide or feed structure and further includes an internal polarization-transforming element disposed within the axial waveguide passage. The polarization-transforming element may comprise a stepped septum polarizer, ridge polarizer, stepped conductive plate, dielectric phase-shifting vane, quarter-wave structure, twist structure, or other suitable field-transforming element.

The rotatable waveguide polarizer body further includes internal transfer passages that extend between a stationary-side interface and respective regions of the axial waveguide passage. Rotation of the rotatable waveguide polarizer body selectively changes the angular relationship between the internal polarization-transforming element and the stationary-side waveguide channels, thereby changing the effective handedness, orientation, or state of the transmitted and/or received polarization. In preferred embodiments, a rotation of approximately 180 degrees produces reversal between opposite circular polarizations, such as left-hand circular polarization and right-hand circular polarization, although other angular displacements and other polarization conversions may be employed depending on the internal polarizer configuration.

In a preferred form, the interface between the rotatable waveguide polarizer body and the stationary waveguide body is provided with one or more waveguide choke structures. The choke structure may comprise one or more grooves, recesses, pits, annular channels, discontinuities, or resonant cavities positioned and dimensioned to present an electrical boundary condition that reduces leakage across a physical gap while allowing relative rotation. The choke-isolated interface allows the rotating body to move without requiring a continuously rubbing RF seal, thereby reducing wear and helping preserve electrical performance over repeated switching cycles.

In some embodiments, the stationary side of the assembly is coupled to a fixed diplexer or other frequency-selective network that combines or separates transmit and receive bands into a common waveguide path. In such embodiments, a single transmit chain, such as one high-power amplifier path, and a single receive chain, such as one low-noise amplifier path, can communicate through the common path to the rotatable waveguide polarizer body. The rotatable waveguide polarizer body can then selectively present one polarization state or its opposite to the antenna. This architecture can eliminate the need for duplicated transmit and receive chains dedicated to separate polarization ports and can eliminate heavy re-routing switch hardware.

In some embodiments, the rotatable waveguide polarizer body is driven by an electric motor, gearmotor, stepper motor, servo motor, or other actuator operatively coupled to the rotating body through a shaft, spline, coupling, keyed interface, or equivalent torque-transfer structure. An encoder, position sensor, detent arrangement, stop arrangement, or controller may be used to define or verify discrete rotational positions corresponding to different polarization states. In other embodiments, the rotatable waveguide polarizer body may be manually rotated, either directly or through a mechanical input mechanism.

In some embodiments, the internal polarizer structure comprises a stepped septum extending axially within an axial bore of the rotating body and dividing at least a substantial length of the bore into two regions. The stepped septum may have a plurality of steps with selected riser heights and tread depths chosen to produce desired phase relationships over a target frequency band. In other embodiments, the internal polarizer structure may comprise one or more longitudinal ridges, dielectric members, twist sections, grating structures, vane structures, or combinations thereof.

The invention thus provides a compact and efficient feed assembly that can effect polarization reversal or selection through controlled rotation of a polarizing waveguide section, while preserving a direct RF path, reducing insertion loss, reducing parts count, improving manufacturability, and impeding straightforward copying by conventional four-port or switched-path arrangements.

BRIEF DESCRIPTION OF THE DRAWINGS

The foregoing and other aspects, objects, features and advantages of the invention will become better understood with reference to the following description, appended claims, and accompanying drawings, where:

Figure 1:
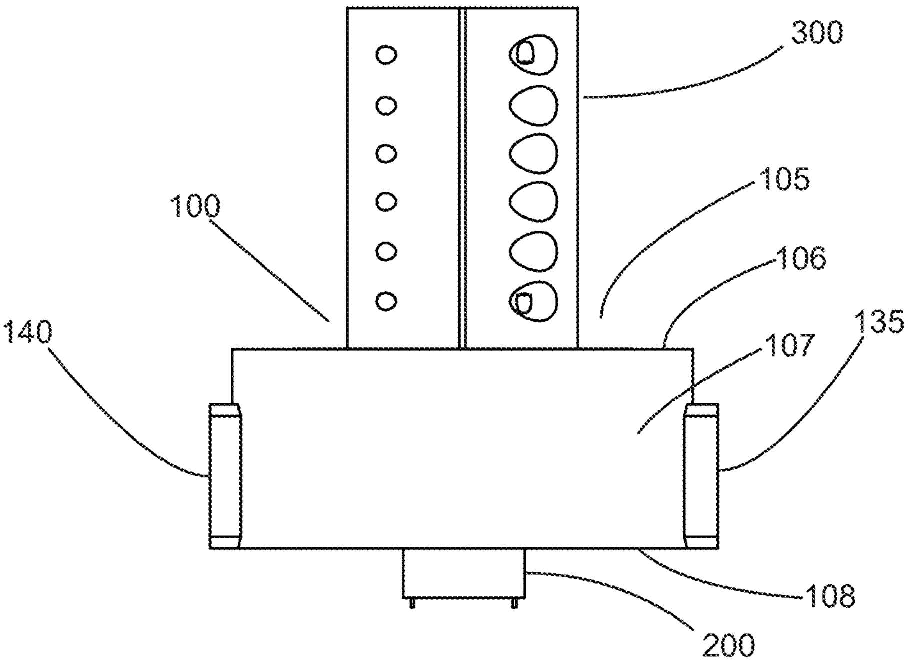
FIG. 1 is a profile view of an exemplary rotatable polarizer feed assembly according to principles of the invention.
Figure 2:
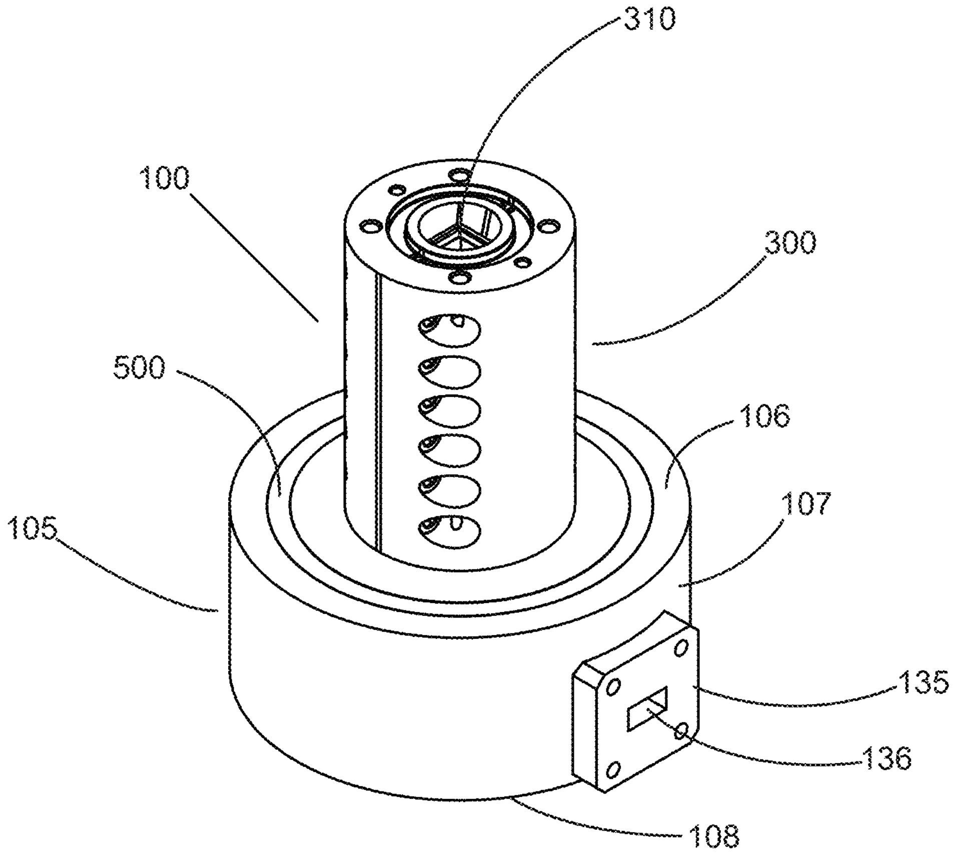
FIG. 2 is a perspective view of an exemplary rotatable polarizer feed assembly according to principles of the invention.
Figure 3:
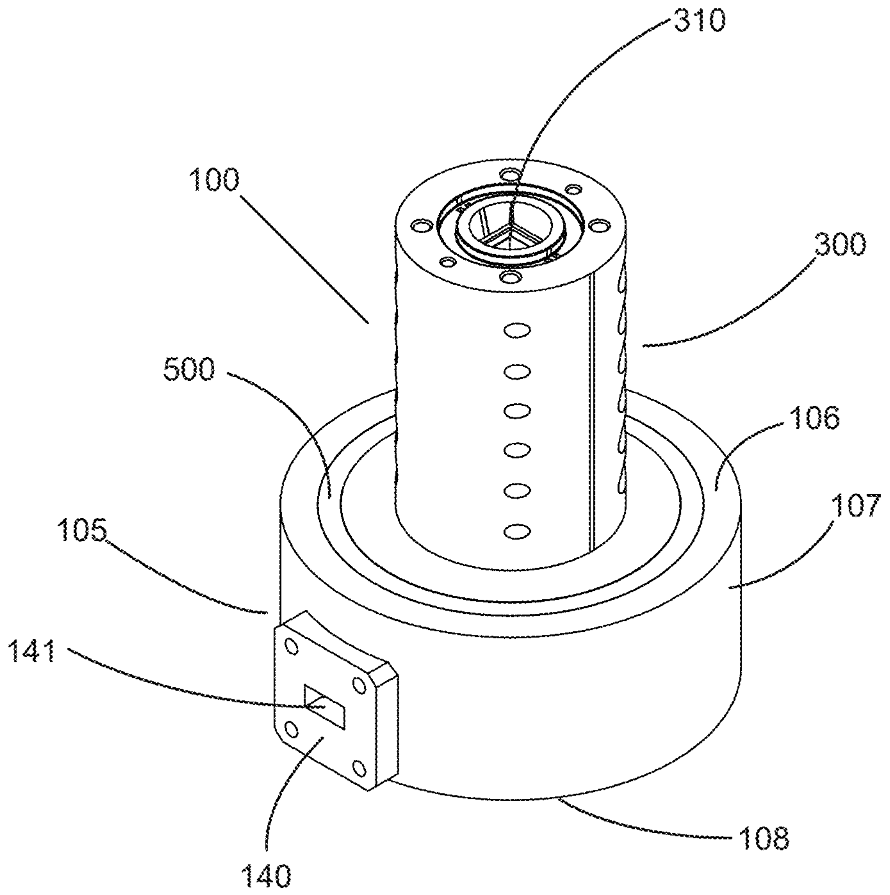
FIG. 3 is another perspective view of an exemplary rotatable polarizer feed assembly according to principles of the invention.

Those skilled in the art will appreciate that the figures are not intended to be drawn to any particular scale; nor are the figures intended to illustrate every embodiment of the invention. The invention is not limited to the exemplary embodiments depicted in the figures or the specific components, configurations, shapes, relative sizes, ornamental aspects or proportions as shown in the figures.

DETAILED DESCRIPTION

With reference to FIGS. 1-7, an exemplary rotatable waveguide polarizer feed assembly 100 is configured to selectively alter the polarization state presented between a fixed RF interface and an antenna-side waveguide passage by rotating an internal polarizer-containing body relative to a stationary waveguide port structure. The assembly 100 may be incorporated into a satellite communications feed system, a microwave transmission or reception system, a radar front end, a broadband dual-polarization antenna architecture, or any other RF system in which polarization conversion, reversal, or selective presentation is desired. The assembly 100 is particularly useful where a designer seeks to avoid the bulk, insertion loss, cost, and complexity associated with multiple duplicated electronic chains or large waveguide switches.

Referring particularly to FIGS. 4, 5, 7, and 12-15, the assembly 100 includes a stationary waveguide port base 105. In the illustrated embodiment, the stationary waveguide port base 105 is a generally cylindrical or substantially cylindrical structural body having a top 106, a sidewall 107, and a bottom 108. The stationary waveguide port base 105 may be machined from metal, cast and finished, additively manufactured, or fabricated by any other suitable process compatible with RF waveguide tolerances and structural requirements. By way of example and not limitation, the stationary waveguide port base 105 may comprise aluminum, brass, copper, plated metal, stainless steel, or another electrically conductive material. In some embodiments, the body may be formed from multiple joined sections to facilitate manufacturing of internal passages.

The stationary waveguide port base 105 includes at least a pair of stationary waveguide channels 110, 115 extending radially, laterally, tangentially, or otherwise outwardly from a central receiving region. In the illustrated embodiment, the stationary waveguide channels 110, 115 are spaced substantially 180 degrees apart about a central rotational axis, although other angular separations may be employed in alternative embodiments. Each stationary waveguide channel 110, 115 defines a radio-frequency transmission path configured to guide electromagnetic energy between a peripheral interface and an internal port region adjacent a rotatable waveguide polarizer body 300 (shown disassembled as 301, 302, 303 and 304 in FIG. 7). The stationary waveguide channels 110, 115 may be rectangular, circular, ridged, quasi-rectangular, or otherwise dimensioned in accordance with the desired operating band, modal behavior, and coupling requirements.

In the illustrated embodiment, each stationary waveguide channel 110, 115 is non-linear and includes a change in direction between its inner end and outer end. More particularly, each stationary waveguide channel 110, 115 includes an inner opening 132, 133 communicating with a central septum body compartment 130 and an outer open end 136, 141 terminating at a respective waveguide flange 135, 140 located on or coupled to the sidewall 107 of the stationary waveguide port base 105. The outer flanges 135, 140 provide mechanical attachment and RF alignment interfaces for coupling to associated components, such as a diplexer, transmit path, receive path, feed electronics, transitions, bends, manifolds, test fixtures, or other waveguide structures. In the illustrated embodiment, the terminal flange planes are oriented differently from the planes of the inner openings 132, 133, thereby enabling a compact packaging arrangement. However, in other embodiments, the stationary waveguide channels may be straight, arcuate, multi-bend, coaxial-to-waveguide coupled, or otherwise configured to suit the installation envelope.

As best seen in FIGS. 4, 5, 13, 14, and 15, the stationary waveguide port base 105 further includes a septum body compartment 130 formed in the top 106 thereof. The septum body compartment 130 is positioned concentrically relative to the rotational axis of the assembly and is shaped and dimensioned to receive at least a lower or base portion 305 of the rotating septum body 300. The septum body compartment 130 may define a cylindrical pocket, bearing seat, annular receiving surface, clearance region, or other support geometry that permits the rotating septum body 300 to be received and supported while remaining rotatable relative to the stationary waveguide port base 105. The inner openings 132, 133 of the stationary waveguide channels 110, 115 open into the septum body compartment 130 such that selective angular alignment may be established between the stationary waveguide channels 110, 115 and corresponding movable transfer passages in the rotating septum body 300.

Referring to FIGS. 4, 5, 7, 13, and 15, a motor compartment 120 is formed in the bottom 108 of the stationary waveguide port base 105. In the illustrated embodiment, the motor compartment 120 is a downwardly opening cavity sized and shaped to receive a motor and encoder assembly 200. The motor compartment 120 may alternatively receive a gearmotor, a stepper motor, a servo actuator, a rotary solenoid, a harmonic drive, a worm gear arrangement, or any other rotary actuator suitable for controlled rotation of the rotating septum body 300. The motor compartment 120 may also receive mounting hardware, wiring, connectors, seals, a controller interface, or environmental protection structures.

An opening 125 is provided between the motor compartment 120 and the septum body compartment 130. The opening 125 is generally concentric with the rotational axis and is sized to permit a shaft 205 of the motor and encoder assembly 200 to extend upwardly and engage the rotating septum body 300. The opening 125 may also accommodate a bearing extension, coupling member, key, spline, bushing, or seal. In some embodiments, the opening 125 may include a sleeve bearing, plain bearing, rolling-element bearing, thrust support, labyrinth seal, or other feature that supports shaft alignment and environmental protection.

Figure 4:
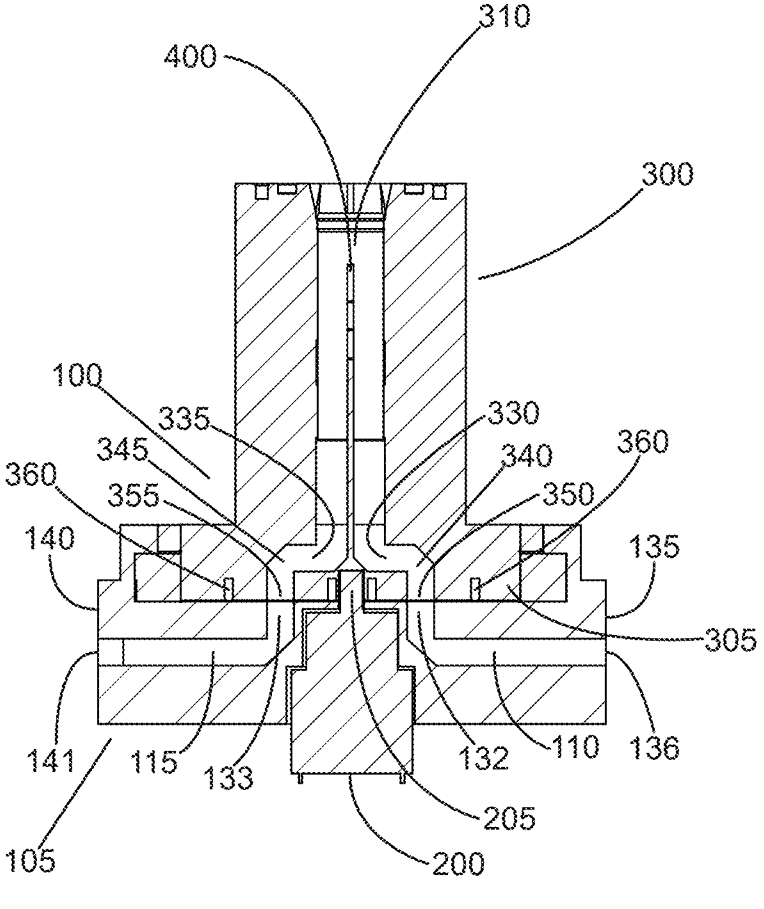
FIG. 4 is a section view of an exemplary rotatable polarizer feed assembly according to principles of the invention.
Figure 5:
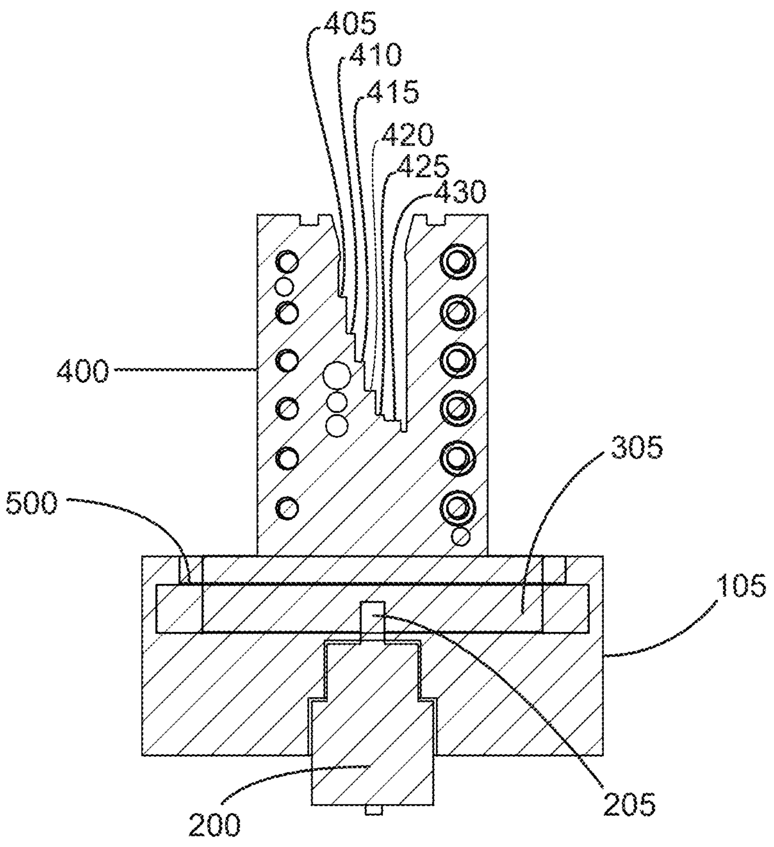
FIG. 5 is another section view of an exemplary rotatable polarizer feed assembly according to principles of the invention.
Figure 6:
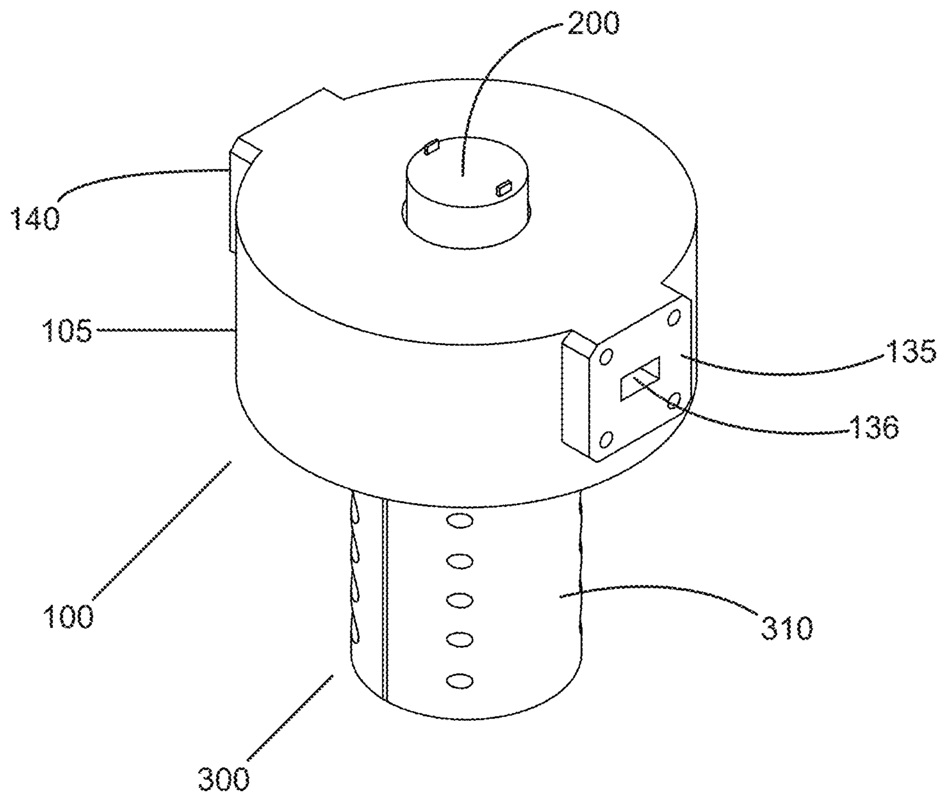
FIG. 6 is another perspective view of an exemplary rotatable polarizer feed assembly according to principles of the invention.
Figure 7:
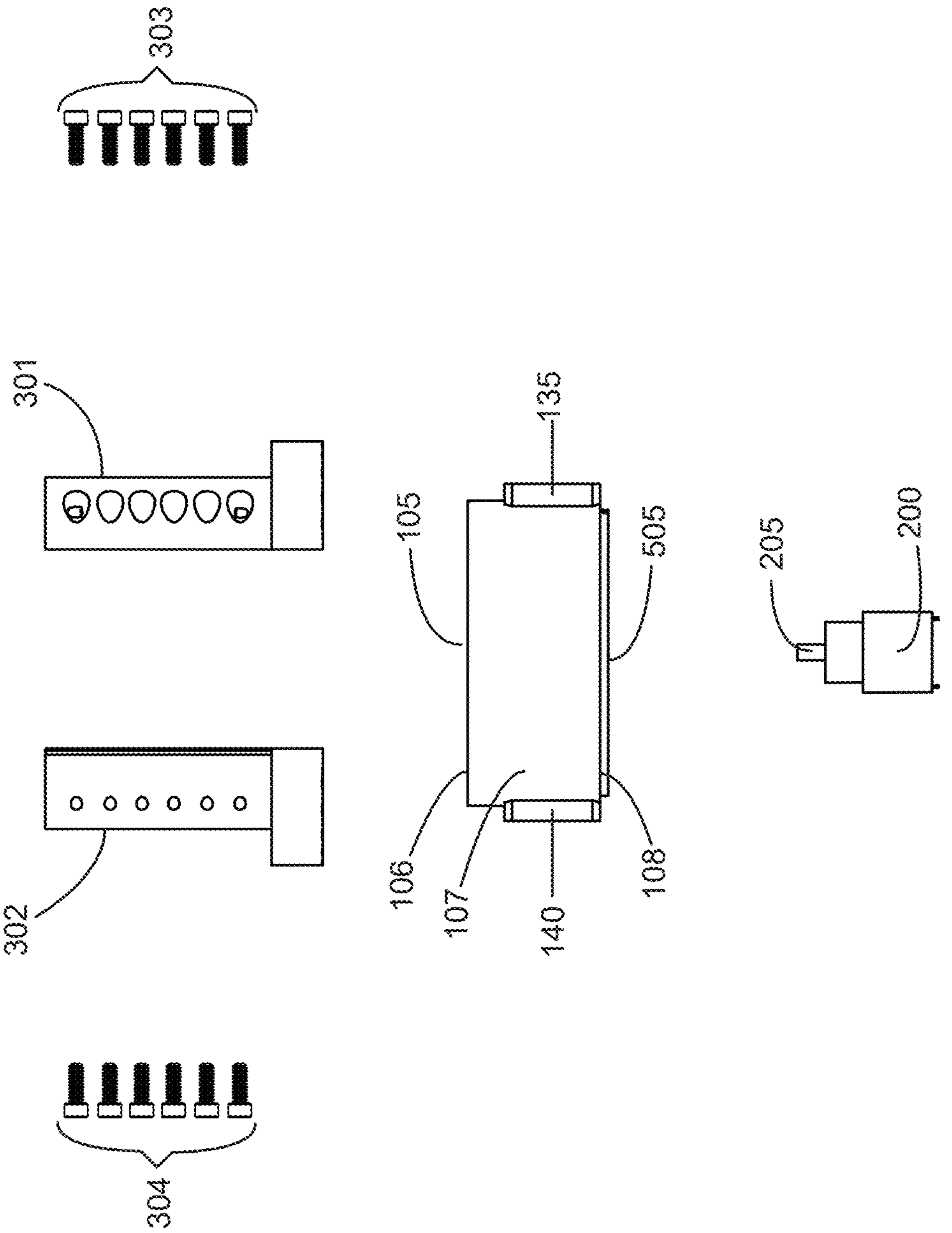
FIG. 7 is an exploded view of an exemplary rotatable polarizer feed assembly according to principles of the invention.
Figure 8:
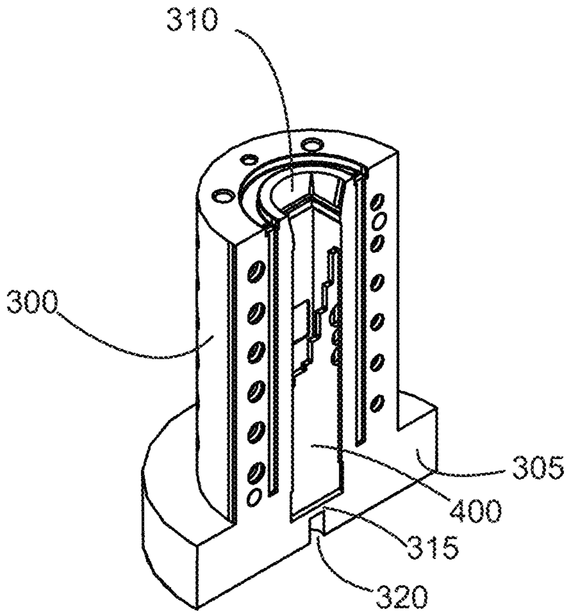
FIG. 8 is a section perspective view of an exemplary rotating septum body with an installed septum according to principles of the invention.

The motor and encoder assembly 200, shown for example in FIGS. 4, 5, and 7, provides controlled rotation of the rotating septum body 300 relative to the stationary waveguide port base 105. The shaft 205 may couple directly to the rotating septum body 300 or indirectly through a coupling feature. Although a motorized implementation is advantageous in many systems because it allows remote polarization switching and feedback-confirmed positioning, the invention is not limited to motorized actuation. In other embodiments, the rotating septum body 300 may be rotated manually by a tool-engageable feature, knob, lever, shaft extension, detented collar, or other mechanism. In still other embodiments, actuation may be pneumatic, hydraulic, magnetic, or electromechanical.

With reference particularly to FIGS. 7-11, the rotating septum body 300 is a generally cylindrical structure configured to rotate relative to the stationary waveguide port base 105 about a central axis. The rotatable waveguide polarizer body (i.e., rotating septum body) 300 includes a base portion 305 and a central axial bore 310 extending from a first end, which in the illustrated embodiment is the upper end, toward an opposite second end. The axial bore 310 defines an antenna-side waveguide passage that may communicate directly or indirectly with a feed horn, antenna throat, transition section, or other antenna-side structure. In preferred embodiments, the axial bore 310 is circular, although square, quasi-circular, ridged, or other waveguide geometries may be employed depending upon the desired polarization-transforming structure and operating band.

Figure 9:
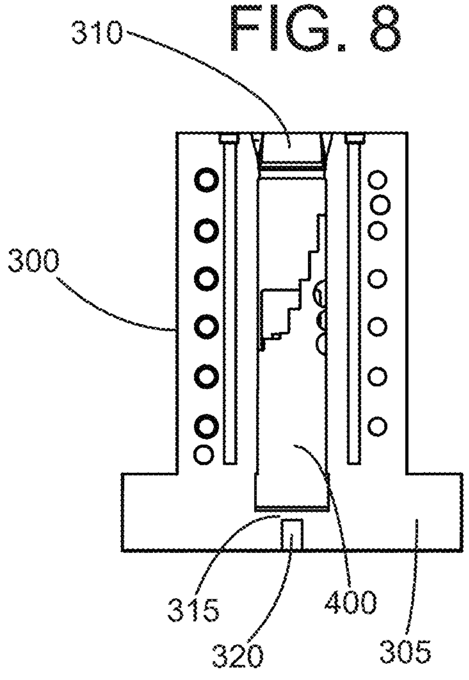
FIG. 9 is a section view of an exemplary rotating septum body with an installed septum according to principles of the invention.
Figure 10:
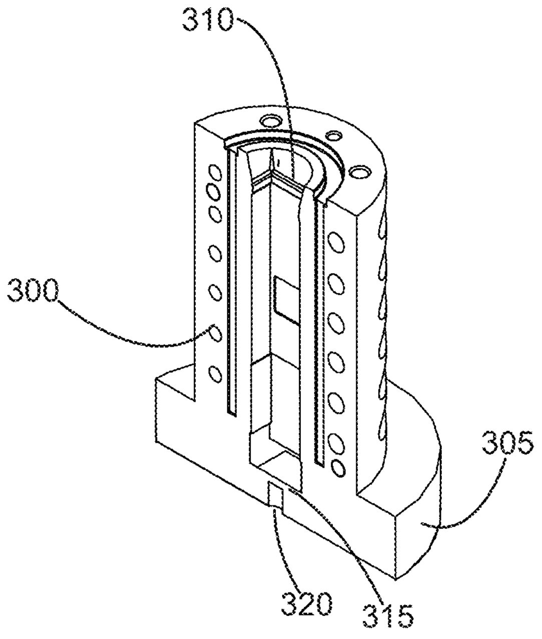
FIG. 10 is a perspective section view of an exemplary rotating septum body without an installed septum according to principles of the invention.
Figure 11:
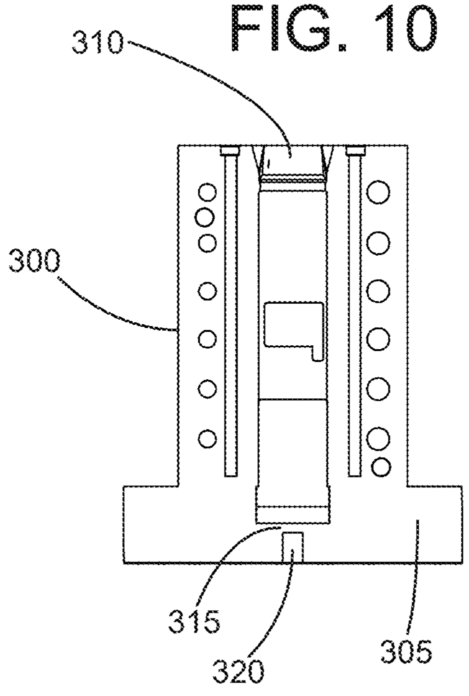
FIG. 11 is a section view of an exemplary rotating septum body without an installed septum according to principles of the invention.
Figure 12:
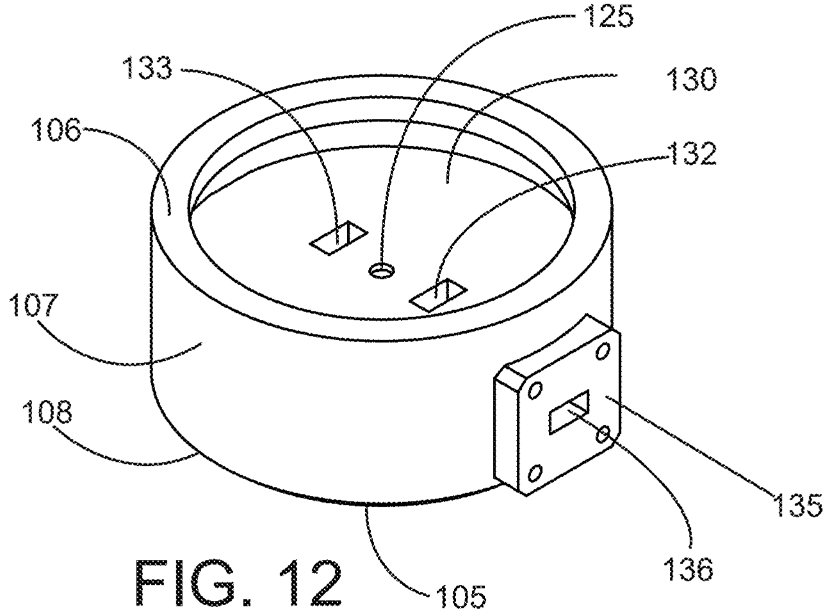
FIG. 12 is a perspective view of an exemplary stationary waveguide port base according to principles of the invention.
Figure 13:
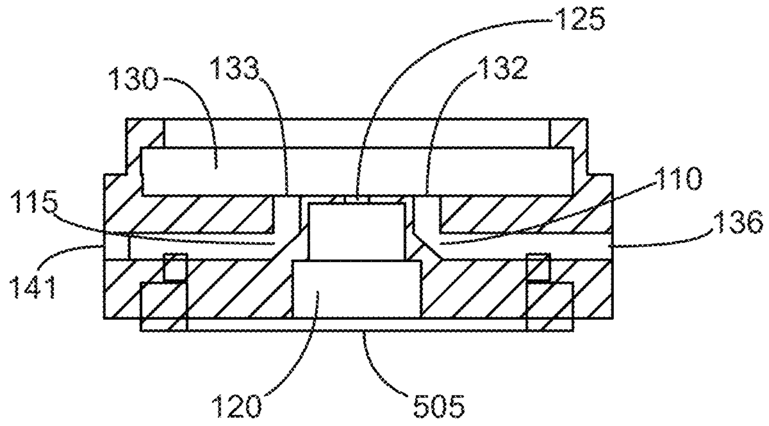
FIG. 13 is a section view of an exemplary stationary waveguide port base according to principles of the invention.
Figure 14:
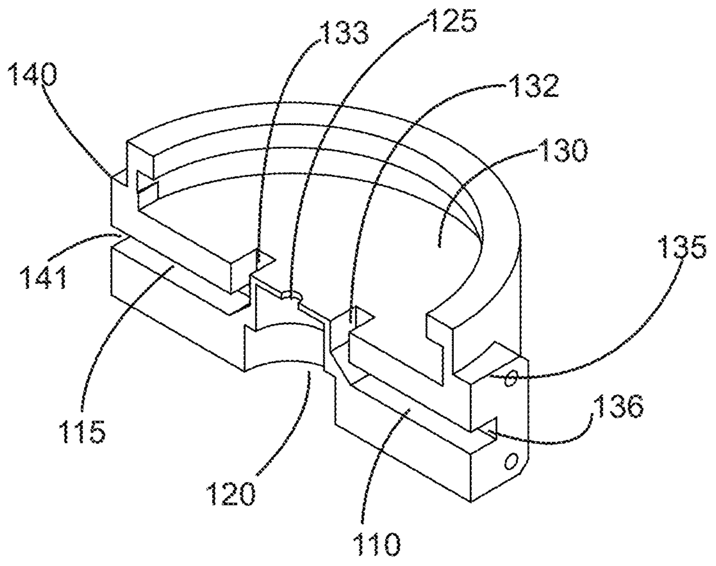
FIG. 14 is a perspective section view of an exemplary stationary waveguide port base according to principles of the invention.
Figure 15:
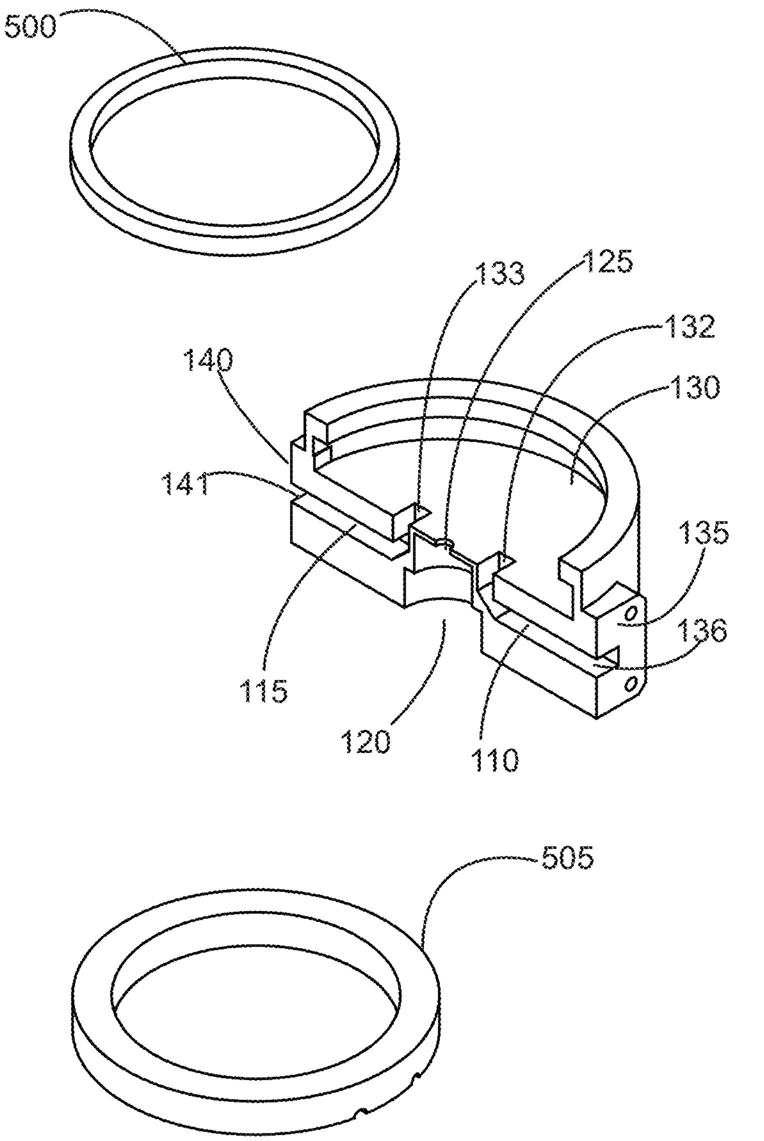
FIG. 15 is an exploded perspective view of an exemplary stationary waveguide port base assembly, with the base being split for illustrative purposes, according to principles of the invention.

As best seen in FIGS. 9 and 11, the axial bore 310 terminates short of the opposite end of the rotating septum body 300, leaving a solid wall 315 between the closed end of the bore and the lower extremity of the rotating body. The solid wall 315 provides structural continuity, supports the internal polarizer structure, and provides a region in which a central cavity 320 may be formed. The central cavity 320 is configured to receive or mate with the shaft 205 of the motor and encoder assembly 200. The coupling between the shaft 205 and the central cavity 320 may be press-fit, keyed, splined, pinned, threaded, clamped, adhesively bonded, or otherwise configured to transfer torque. In alternative embodiments, the shaft may couple to the rotating septum body 300 through a coupling insert, hub, drive plate, or intermediary transmission element.

The base portion 305 of the rotating septum body 300 includes an external annular flange or bearing support region. In the illustrated embodiment, the base portion 305 is dimensioned to be received within the septum body compartment 130 of the stationary waveguide port base 105. The external geometry of the base portion 305 provides support surfaces, sealing surfaces, alignment surfaces, and space for the formation of transfer openings and choke structures. The base portion 305 is concentric with the axial bore 310 and rotates as a unit with the remainder of the rotating septum body 300.

Disposed within the axial bore 310 is a polarization-transforming structure in the form of a septum 400. As shown most clearly in FIGS. 8 and 9, the septum 400 extends axially within the axial bore 310 and divides a substantial portion of the bore into two regions. In the illustrated embodiment, the septum 400 is formed as a generally planar conductive plate having a width approximately equal to the inner diameter of the axial bore 310 so that the opposite lateral edges of the septum 400 engage or are closely adjacent corresponding inner surfaces of the axial bore 310. The septum 400 may be integral with the rotating septum body 300, inserted into a slot, brazed, welded, mechanically retained, press-fit, fastened, or otherwise secured within the axial bore 310.

The septum 400 extends from the solid wall 315 toward the open first end of the axial bore 310 but is not necessarily coterminous with the full length of the bore. In preferred embodiments, the septum 400 extends over a substantial but incomplete length of the axial bore 310, for example about two-thirds to about five-sixths of the distance from the solid wall 315 to the open first end. This partial-length configuration allows the open-end region of the axial bore 310 to participate in field transformation and modal development associated with the desired polarization conversion. The exact length may be selected as a function of frequency band, desired bandwidth, axial ratio, return loss, and manufacturability.

The septum 400 is preferably configured as a ridge polarizer or stepped septum polarizer. The end of the septum 400 nearest the solid wall 315 may be relatively full-height or fixed, while the opposite end toward the open first end includes a stepped profile comprising a plurality of steps 405, 410, 415, 420, 425 and 430. In the exemplary embodiment, five or six steps are provided, although more or fewer steps may be employed. The steps 405, 410, 415, 420, 425 and 430 define selected tread depths and riser heights that create a controlled phase and impedance transformation between orthogonal field components as the wave propagates through the polarizer region. In one implementation, the riser heights of the first one or two lowest steps are smaller than the riser heights of subsequent steps, while the subsequent riser heights are approximately equal to one another. The tread depth of the first step may be greater than the tread depths of the remaining steps, which may be approximately equal to one another. Such geometrical tailoring may improve bandwidth, phase balance, return loss, and polarization purity.

The septum 400 may operate to convert linear polarization components into circular polarization components, convert circular polarization into linear polarization, or otherwise establish a desired phase relationship between orthogonal field components. When the rotating septum body 300 is rotated by approximately 180 degrees, the relative orientation of the stepped polarizing geometry with respect to the stationary-side coupling structure is reversed. This reversal may effectively change the handedness of the circular polarization presented at the axial bore 310, such as from left-hand circular polarization to right-hand circular polarization or vice versa. Depending upon the implementation, the same architecture may be adapted to rotate a linear polarization orientation or select between other orthogonal polarization states.

Within each of the two regions defined by the septum 400 in the axial bore 310, the rotating septum body 300 includes an opening 330, 335 leading to a corresponding internal transfer channel 340, 345. As shown in FIGS. 8-11, each transfer channel 340, 345 extends from a respective upper opening 330, 335 in the wall of the axial bore 310 to a respective lower opening 350, 355 formed in the base portion 305. The transfer channels 340, 345 thus provide communication between the stationary-side interface at the base portion 305 and the respective regions of the septum-divided axial bore 310. The transfer channels 340, 345 may be formed by machining, drilling and plugging, electrical discharge machining, additive manufacturing, split-body assembly, or any other suitable technique.

During operation, the lower openings 350, 355 of the transfer channels 340, 345 are selectively brought into alignment with the stationary inner openings 132, 133 of the stationary waveguide channels 110, 115 by rotation of the rotating septum body 300. In one discrete rotational position, the correspondence between the stationary waveguide channels 110, 115 and the transfer channels 340, 345 may establish a first polarization state. In another discrete rotational position, preferably separated by about 180 degrees, the correspondence is reversed, thereby establishing an opposite polarization state. This mechanically implemented reversal eliminates the need to re-route signals through a separate high-power waveguide switch and avoids the need for a second parallel amplifier path dedicated to the alternate polarization.

The architecture of the assembly 100 is structurally and functionally distinct from conventional waveguide rotary joints used in continuously rotating antenna systems, such as radar antenna pedestals or tracking dish assemblies. In a conventional rotary joint, the rotating and stationary halves are designed to maintain continuous RF coupling throughout 360 degrees of rotation, typically by employing circular waveguide in both halves and relying on rotational symmetry of the propagating mode so that no orientation-dependent coupling is required. The assembly 100, by contrast, relies upon orientation-dependent coupling: the lower openings 350, 355 of the transfer channels 340, 345 are dimensioned and positioned to provide RF coupling to the stationary inner openings 132, 133 only at selected discrete angular positions of the rotating septum body 300, and the polarization-transforming function of the septum 400 depends on the specific angular relationship between the septum 400 and the stationary waveguide channels 110, 115. The combination of (i) orientation-dependent angular coupling between the stationary waveguide channels and the internal transfer channels of the rotating body, (ii) a polarization-transforming structure rotationally fixed to the rotating body whose effective polarization output depends on its angular orientation relative to the stationary channels, and (iii) a choke structure at the rotating interface that maintains RF integrity across a physical gap at the selected discrete positions, provides a polarization-reversal architecture that is not replicated by conventional continuous-rotation rotary joints, by multiple-amplifier feed arrangements, or by waveguide switch-based re-routing architectures.

A notable feature of the invention is the rotating RF interface formed between the rotating septum body 300 and the stationary waveguide port base 105. As shown in FIGS. 8-11 and 13-15, one or more waveguide choke structures 360 are formed in the base portion 305 of the rotating septum body 300, between the lower openings 350, 355 and the outer periphery of the base portion 305. The waveguide choke structure 360 may comprise discrete groove segments associated with respective openings 350, 355, or it may comprise a substantially annular groove concentric with the rotational axis. The depth, width, and radial position of the waveguide choke structure 360 may be selected in relation to the operating wavelength, and in many embodiments the choke depth may be on the order of one-quarter wavelength at a design frequency. The waveguide choke structure 360 establishes an electrical boundary condition that suppresses RF leakage and preserves impedance continuity across a physical non-contact or low-contact interface between the rotating and stationary components.

The use of the waveguide choke structure 360 is particularly advantageous because it allows the rotating septum body 300 to rotate relative to the stationary waveguide port base 105 without requiring a continuously rubbing RF contact surface at the primary sealing boundary. This can reduce friction, wear, and particulate formation and can improve long-term repeatability of return loss, insertion loss, and polarization characteristics. The waveguide choke structure 360 also assists in preventing external noise ingress and preserving isolation at the rotating interface. In some embodiments, more than one choke groove may be employed, and the grooves may have different depths or widths to broaden effective suppression across a desired band.

To facilitate physical rotation of the rotating septum body 300 within the septum body compartment 130, a bearing 500 may be disposed between the rotating and stationary components, as shown in FIGS. 4, 5, and 7. The bearing 500 may be a ring-shaped low-friction element, such as a thrust washer, sleeve bearing, polymeric bearing ring, metallic bearing ring, dry bearing element, or rolling-element bearing assembly. The bearing 500 may support axial load, radial load, or both. In some embodiments, multiple bearing elements may be employed, including upper and lower bearing rings, thrust races, or preload structures. The bearing arrangement may be selected to maintain alignment and rotational smoothness while preserving the desired choke gap and RF interface geometry.

An optional spacer 505, shown for example in FIG. 7, may be provided beneath the stationary waveguide port base 105. The spacer 505 may be ring-like and may function as a standoff, mounting adapter, thermal isolator, thickness compensator, or structural alignment element. In some embodiments, the spacer 505 may provide clearance for the motor and encoder assembly 200, mounting fasteners, wiring, or a mating support frame.

With continuing reference to FIGS. 1-7, the assembly 100 may be integrated into a broader feed architecture in which fixed electronic components are connected to the stationary waveguide flanges 135, 140 through a diplexer or other frequency-separating network. In one preferred implementation, a single high-power amplifier transmit chain and a single low-noise amplifier receive chain are coupled to a fixed diplexer that combines the transmit and receive bands into a common waveguide interface. The common waveguide interface communicates with the stationary waveguide channels 110, 115 and, through the selectively oriented rotating septum body 300, with the antenna-side axial bore 310. Because polarization reversal is achieved mechanically by rotating the polarizer geometry rather than electrically by re-routing multiple amplifier paths, the overall architecture can be more compact, lighter, and lower loss than conventional four-port or switch-based arrangements.

In use, an operator or control system may command the motor and encoder assembly 200 to rotate the rotating septum body 300 from a first indexed position to a second indexed position with sufficient speed to accomplish polarization reversal on a timescale of microseconds, suitable for maintaining an active satellite communications link without dropping the link or requiring a modem reset during transitions between spot beams of opposite circular polarization handedness. Such rapid polarization reversal is particularly advantageous in two classes of application: first, airborne terminals in which an aircraft in flight traverses multiple spot beams from one or more satellites that employ opposite circular polarization handedness in adjacent beams; and second, stationary ground terminals tracking a satellite in a medium earth orbit or low earth orbit, in which the moving satellite transitions between spot beams of opposite circular polarization handedness as it moves across the sky. In both cases, the failure to reverse polarization within the required transition time results in a dropped link and a communication outage lasting on the order of several minutes while the modem resets. The assembly 100 addresses this need by enabling microsecond-range mechanical polarization reversal through controlled rotation of the rotating septum body 300, driven by the motor and encoder assembly 200. Although the illustrated embodiment achieves this rapid reversal in the context of circular polarization, the same architecture may provide analogous speed advantages in linear polarization applications where rapid reorientation of polarization state is required to sustain a link during beam transitions.

The microsecond-range polarization reversal capability of the assembly 100 is achievable because the reversal requires only a discrete mechanical rotation of the rotating septum body 300 through a fixed angular increment, typically approximately 180 degrees, rather than any reconfiguration of electronic signal paths, any operation of high-power waveguide switches, or any change in amplifier bias or routing state. Existing polarization-switching architectures that rely on motorized skew adjustment of an entire feed or LNB assembly are designed for slow alignment corrections measured in seconds, not link-sustaining transitions measured in microseconds, and the mass and rotational inertia of such assemblies preclude microsecond-range actuation. Architectures that rely on waveguide switches to re-route transmit or receive signals between polarization ports are constrained by the actuation time of the switch mechanism, which typically operates on a millisecond timescale and involves movement of a switch element within a high-power waveguide path, adding mechanical and RF complexity. The assembly 100 avoids both constraints: because the polarization-transforming geometry is embodied in a compact rotating septum body 300 of minimal rotational inertia, and because the actuation path does not include any element inserted in a high-power waveguide signal path, the motor and encoder assembly 200 can complete the required angular displacement within a microsecond-range transition time. This capability is a direct result of the specific combination of a compact rotating septum body, internal transfer passages routing RF energy through the base portion of the rotating body to the stationary channels, and a choke-isolated interface maintaining RF performance across the rotating gap, which together enable the polarization-reversal function to be embodied in a small, low-inertia rotating element actuated by a compact motor outside the RF signal path.

In transmit operation, RF energy from a fixed high-power amplifier chain may pass through a diplexer and into the stationary waveguide channels 110, 115, then through the aligned transfer channels 340, 345 and into the axial bore 310 of the rotating septum body 300. The septum 400 transforms or conditions the orthogonal components of the field such that the signal presented at the antenna-side end of the axial bore 310 has the selected polarization characteristic. In receive operation, incoming antenna energy follows the reverse path through the axial bore 310, past the septum 400, through the transfer channels 340, 345, into the stationary waveguide channels 110, 115, and onward through the diplexer to a low-noise receive chain. Because the architecture employs a direct and compact path rather than a larger switched manifold, insertion loss can be reduced and receive sensitivity preserved.

Although the illustrated embodiment uses a stepped conductive septum 400, the invention is not limited to that specific internal polarizer structure. In alternative embodiments, the polarization-transforming element may comprise one or more longitudinal ridges in a square, rectangular, or circular waveguide; a dielectric slab or vane configured as a quarter-wave plate; a twist polarizer section; a helical or spiral field-rotating structure; a grating polarizer; a vane-based polarizer; or any other passive or active polarization-transforming structure capable of producing the desired polarization control as a function of angular orientation. Similarly, although the exemplary embodiment employs a cylindrical rotating body, other cross-sectional geometries may be used so long as the body remains rotatable and provides the desired RF performance.

The stationary waveguide channels 110, 115 and the transfer channels 340, 345 may also take alternative forms. For example, the channels may be ridged waveguides to extend bandwidth, may include matching features to improve return loss, may incorporate chamfers or radiused transitions to reduce mode conversion, or may be tuned for a particular satellite band, such as X-band, Ku-band, Ka-band, or another microwave band. The flanges 135, 140 may conform to industry-standard waveguide flange formats or custom interfaces. The axial bore 310 may likewise be dimensioned for circular waveguide operation in a target frequency range.

The actuation system may also vary. The motor and encoder assembly 200 may include a stepper motor capable of indexed half-turn operation, a servo motor capable of closed-loop angular positioning, or a simple geared DC motor with limit switches. In some embodiments, the assembly may include a clutch or manual override. In harsh-environment embodiments, the motor compartment 120 may be sealed against dust, moisture, salt spray, or pressure differentials. In cryogenic, space, or high-vibration implementations, bearing material, lubricant selection, and thermal expansion matching may be adapted accordingly.

The rotating interface may also include additional sealing or environmental protection features. For example, one or more O-rings, labyrinth seals, metallic seals, purge ports, or desiccant chambers may be provided to prevent moisture ingress while maintaining the desired RF choke characteristics. The choke structure 360 may be positioned on the rotating body, on the stationary body, or on both. In some embodiments, plural concentric choke grooves may provide multi-band or broadband suppression. In other embodiments, the choke geometry may be segmented or shaped to correspond to particular port positions.

The invention also contemplates embodiments in which the rotating body aligns with more than two stationary positions, including indexed positions corresponding to additional polarization states, calibration positions, test positions, or maintenance positions. Likewise, although a 180-degree rotation is particularly useful for reversal between opposite circular polarizations, other angular displacements may be used for other polarization transformations. The control system may include software or firmware that coordinates polarization selection with transceiver settings, satellite beam assignments, antenna pointing systems, or network-management commands.

From a manufacturing standpoint, the assembly 100 provides substantial advantages. The overall feed path may be formed as a relatively compact in-line structure having fewer parts than conventional multi-amplifier or switch-based systems. The reduced number of waveguide runs, bends, manifolds, and heavy switch bodies can simplify fabrication and inspection. The reduced component count can also simplify assembly, reduce cost, and reduce the mass supported at the antenna feed location. These advantages can be especially significant in gimbaled, mobile, airborne, maritime, or space-constrained systems.

From an electrical standpoint, the invention provides a direct path with minimal additional insertion loss relative to architectures that insert a large waveguide switch into the RF path. The absence of a duplicated standby amplifier chain may also reduce power consumption, thermal load, and warm-up or biasing complexity. The choke-isolated rotating interface helps preserve stable VSWR and polarization performance over repeated use. By rotating the internal polarizer rather than switching among multiple fixed RF chains, the invention provides an efficient and elegant mechanism for achieving polarization agility.

While an exemplary embodiment of the invention has been described, it should be apparent that modifications and variations thereto are possible, all of which fall within the true spirit and scope of the invention. With respect to the above description then, it is to be realized that the optimum relationships for the components and steps of the invention, including variations in order, form, content, function and manner of operation, are deemed readily apparent and obvious to one skilled in the art, and all equivalent relationships to those illustrated in the drawings and described in the specification are intended to be encompassed by the present invention. The above description and drawings are illustrative of modifications that can be made without departing from the present invention, the scope of which is to be limited only by the following claims. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents are intended to fall within the scope of the invention as claimed.

The invention claimed is:

1. A rotatable waveguide polarizer feed assembly, comprising:

a stationary waveguide port structure comprising a central receiving region, a first stationary waveguide channel, and a second stationary waveguide channel, the first stationary waveguide channel and the second stationary waveguide channel each opening into the central receiving region;

a rotatable waveguide body received in the central receiving region and rotatable relative to the stationary waveguide port structure about a rotational axis, the rotatable waveguide body comprising an axial waveguide passage extending along the rotational axis, a first internal transfer passage extending between the axial waveguide passage and a first interface opening of the rotatable waveguide body, and a second internal transfer passage extending between the axial waveguide passage and a second interface opening of the rotatable waveguide body; and a polarization-transforming structure disposed in the axial waveguide passage and rotationally fixed relative to the rotatable waveguide body;

wherein rotation of the rotatable waveguide body relative to the stationary waveguide port structure changes an angular orientation of the polarization-transforming structure relative to the first stationary waveguide channel and the second stationary waveguide channel to change a polarization state communicated through the axial waveguide passage, and wherein the polarization state is changed by rotation of the polarization-transforming structure rather than by routing RF energy through an alternative fixed polarization path, wherein the rotatable waveguide body further comprises a choke structure formed between the first interface opening and the second interface opening and an outer periphery of the rotatable waveguide body, the choke structure being configured to suppress RF leakage across a physical gap at a rotary interface between the rotatable waveguide body and the stationary waveguide port structure while permitting relative rotation therebetween.

2. The rotatable waveguide polarizer feed assembly of claim 1, wherein the polarization-transforming structure comprises a stepped septum extending over a substantial but incomplete length of the axial waveguide passage.

3. The rotatable waveguide polarizer feed assembly of claim 2, wherein the stepped septum comprises a plurality of steps including at least a first step having a tread depth greater than a tread depth of at least one adjacent step.

4. The rotatable waveguide polarizer feed assembly of claim 1, wherein the rotatable waveguide body further comprises a choke structure positioned between the first interface opening and the second interface opening and an outer periphery of the rotatable waveguide body to suppress RF leakage across a rotary interface.

5. The rotatable waveguide polarizer feed assembly of claim 4, wherein the choke structure comprises at least one annular groove concentric with the rotational axis.

6. The rotatable waveguide polarizer feed assembly of claim 1, further comprising an actuator configured to rotate the rotatable waveguide body between a first indexed angular position corresponding to a first polarization state and a second indexed angular position corresponding to a second polarization state, wherein the actuator is configured to effect the rotation at a speed sufficient to reverse the polarization state within a microsecond-range transition time to maintain an active satellite communications link during a transition between spot beams of opposite polarization handedness without dropping the link or requiring a modem reset.

7. The rotatable waveguide polarizer feed assembly of claim 6, wherein the first indexed angular position and the second indexed angular position are separated by approximately 180 degrees to reverse handedness between left-hand circular polarization and right-hand circular polarization.

8. The rotatable waveguide polarizer feed assembly of claim 6, wherein the microsecond-range transition time is sufficient to sustain an active communications link when an airborne terminal traverses a boundary between adjacent spot beams of opposite circular polarization handedness transmitted by one or more satellites.

9. The rotatable waveguide polarizer feed assembly of claim 6, wherein the microsecond-range transition time is sufficient to sustain an active communications link when a stationary ground terminal tracks a satellite in a medium earth orbit or low earth orbit that transitions between spot beams of opposite circular polarization handedness as the satellite moves across the sky.

10. A radio-frequency feed system for selective polarization reversal, comprising:

a fixed RF section comprising a transmit signal path and a receive signal path;

a frequency-selective network coupled to the fixed RF section and configured to combine or separate the transmit signal path and the receive signal path at a common waveguide interface;

a stationary waveguide coupling structure coupled to the common waveguide interface;

a rotatable waveguide polarizer structure coupled to the stationary waveguide coupling structure and comprising an internal polarization-transforming structure positioned in an antenna-side waveguide passage; and a rotary waveguide interface between the stationary waveguide coupling structure and the rotatable waveguide polarizer structure, the rotary waveguide interface comprising a choke-defined RF leakage suppression region that permits mechanical rotation of the rotatable waveguide polarizer structure relative to the stationary waveguide coupling structure, wherein mechanical rotation of the rotatable waveguide polarizer structure selectively reverses handedness between opposite circular polarizations communicated through the antenna-side waveguide passage, wherein the rotatable waveguide polarizer structure comprises a first internal transfer passage and a second internal transfer passage each extending between the antenna-side waveguide passage and a respective interface opening of the rotatable waveguide polarizer structure, the interface openings being selectively brought into angular alignment with the stationary waveguide coupling structure at discrete indexed rotational positions of the rotatable waveguide polarizer structure to establish corresponding discrete polarization states.

11. The radio-frequency feed system of claim 10, wherein the fixed RF section comprises a single transmit amplifier chain and a single receive amplifier chain.

12. The radio-frequency feed system of claim 10, wherein the internal polarization-transforming structure comprises a stepped conductive septum disposed in a circular waveguide bore.

13. The radio-frequency feed system of claim 10, wherein the internal polarization-transforming structure comprises at least one of a ridge polarizer, a dielectric vane, a quarter-wave phase-shifting structure, a twist polarizer, or a grating polarizer.

14. The radio-frequency feed system of claim 10, further comprising a motor and position-sensing arrangement configured to establish at least two discrete angular positions of the rotatable waveguide polarizer structure and to effect transition between the at least two discrete angular positions within a microsecond-range transition time sufficient to maintain an active satellite communications link during a spot beam transition between beams of opposite circular polarization handedness.

15. The radio-frequency feed system of claim 14, wherein the spot beam transition occurs during traversal of a boundary between adjacent spot beams by an airborne terminal, or during tracking of a moving satellite in a medium earth orbit or low earth orbit by a stationary ground terminal, as the satellite transitions between spot beams of opposite circular polarization handedness.

16. The radio-frequency feed system of claim 10, wherein the stationary waveguide coupling structure comprises a first stationary waveguide channel and a second stationary waveguide channel spaced apart about a rotational axis of the rotatable waveguide polarizer structure.

17. The radio-frequency feed system of claim 10, wherein the choke-defined RF leakage suppression region comprises a non-contact or low-contact interface configured to reduce frictional wear relative to a contacting rotary RF joint.

18. A method of operating a polarization-selective waveguide feed assembly, comprising:

providing a fixed RF section including a transmit signal path and a receive signal path;

combining or separating the transmit signal path and the receive signal path through a frequency-selective network at a common waveguide interface;

communicating RF energy between the common waveguide interface and a rotatable waveguide body through a stationary waveguide structure;

passing the RF energy through an axial waveguide passage of the rotatable waveguide body containing a polarization-transforming structure; and rotating the rotatable waveguide body relative to the stationary waveguide structure to change an angular orientation of the polarization-transforming structure and thereby change a polarization state communicated through the axial waveguide passage without switching the RF energy through a separate waveguide switching device, suppressing RF leakage at a rotary interface between the rotatable waveguide body and the stationary waveguide structure using a choke structure carried by the rotatable waveguide body, the choke structure maintaining RF integrity across a physical gap at the rotary interface while permitting the rotatable waveguide body to rotate to a selected discrete angular position at which internal transfer passages of the rotatable waveguide body are brought into alignment with corresponding waveguide channels of the stationary waveguide structure to establish the changed polarization state.

19. The method of claim 18, wherein rotating the rotatable waveguide body comprises rotating the rotatable waveguide body by approximately 180 degrees to reverse handedness between right-hand circular polarization and left-hand circular polarization within a microsecond-range transition time sufficient to maintain an active satellite communications link without dropping the link or requiring a modem reset during a transition between spot beams of opposite circular polarization handedness.

20. The method of claim 18, wherein passing the RF energy through the axial waveguide passage comprises passing the RF energy through an axial waveguide passage containing a stepped septum that extends over a substantial but incomplete length of the axial waveguide passage.

21. The method of claim 18, further comprising suppressing RF leakage across a physical rotary boundary between the rotatable waveguide body and the stationary waveguide structure using at least one choke groove.

22. The method of claim 18, further comprising rotating the rotatable waveguide body with a motor coupled to the rotatable waveguide body through a shaft received in a cavity of the rotatable waveguide body.

23. The method of claim 18, further comprising selecting one of at least two discrete polarization states while maintaining a common transmit/receive waveguide path between the fixed RF section and the rotatable waveguide body.

24. The method of claim 18, wherein the polarization state is changed within a microsecond-range transition time during at least one of: traversal by an airborne terminal of a boundary between adjacent spot beams of opposite circular polarization handedness transmitted by one or more satellites; or tracking by a stationary ground terminal of a satellite in a medium earth orbit or low earth orbit as the satellite transitions between spot beams of opposite circular polarization handedness.

* * * * *